(12) United States Patent
Neubrand

(10) Patent No.: US 7,309,098 B2
(45) Date of Patent: Dec. 18, 2007

(54) MOTOR VEHICLE WITH A RETRACTABLE ROOF

(75) Inventor: Frank Neubrand, West Bloomfield, MI (US)

(73) Assignee: Wilhelm Karmann GmbH, Osnabruck (DE)

( * ) Notice: Subject to any disclaimer, the term of this patent is extended or adjusted under 35 U.S.C. 154(b) by 34 days.

(21) Appl. No.: 10/542,462

(22) PCT Filed: Jan. 8, 2004

(86) PCT No.: PCT/DE2004/000011

§ 371 (c)(1),
(2), (4) Date: Apr. 24, 2006

(87) PCT Pub. No.: WO2004/065156

PCT Pub. Date: Aug. 5, 2004

(65) Prior Publication Data

US 2006/0232097 A1    Oct. 19, 2006

(30) Foreign Application Priority Data

Jan. 16, 2003    (DE) ................... 203 00 648 U

(51) Int. Cl.
*B60J 7/00* (2006.01)
(52) U.S. Cl. .................. 296/107.17; 296/108
(58) Field of Classification Search .......... 296/107.17, 296/107.16, 107.2, 108, 107.08
See application file for complete search history.

(56) References Cited

U.S. PATENT DOCUMENTS

| | | | |
|---|---|---|---|
| 5,833,300 A | | 11/1998 | Russke |
| 6,572,175 B2 * | 6/2003 | Schutt et al. ........... 296/107.17 |
| 6,592,168 B2 | 7/2003 | Hasselgruber et al. |
| 6,666,495 B2 * | 12/2003 | Nania .................... 296/107.08 |
| 6,736,444 B2 | 5/2004 | Reinsch |
| 6,739,645 B2 * | 5/2004 | Papendorf et al. ..... 296/107.17 |
| 6,830,282 B2 * | 12/2004 | Guillez et al. ......... 296/107.17 |
| 6,837,533 B2 * | 1/2005 | Wojciech et al. ...... 296/107.17 |
| 6,860,541 B2 * | 3/2005 | Guillez et al. ......... 296/107.17 |
| 6,866,326 B2 * | 3/2005 | Hoppermann .......... 296/107.17 |
| 6,921,124 B2 * | 7/2005 | Guillez et al. ......... 296/107.17 |
| 6,957,843 B2 * | 10/2005 | Guillez .................. 296/107.08 |
| 6,983,976 B2 * | 1/2006 | Reinsch ................. 296/107.17 |
| 7,004,531 B2 * | 2/2006 | Obendiek .............. 296/107.17 |
| 7,100,963 B2 * | 9/2006 | Queveau et al. ........... 296/108 |
| 2003/0080580 A1 * | 5/2003 | Obendiek .............. 296/107.17 |
| 2004/0113453 A1 * | 6/2004 | Guillez et al. ........... 296/107.2 |
| 2005/0127709 A1 | 6/2005 | Guillez et al. |
| 2005/0156449 A1 | 7/2005 | Bruder et al. |
| 2007/0090664 A1 * | 4/2007 | Wezyk .................. 296/107.17 |

FOREIGN PATENT DOCUMENTS

EP    0 835 780 B1    4/1998

* cited by examiner

*Primary Examiner*—Kiran B. Patel
(74) *Attorney, Agent, or Firm*—Gifford, Krass, Sprinkle, Anderson & Citkowski, P.C.

(57) ABSTRACT

A motor vehicle with a retractable roof includes front and rear rigid roof parts that are movable between a closed position covering the passenger compartment and an open position stored in a rear receiver space. An articulated connector interconnects the front and rear roof parts. The articulated connector includes two control levers, which form a four-bar linkage, and a support plate. The control levers each having one end rotatably connected to the rear roof part and another end rotatably connected to the support plate. The support plate is movably connected to the front roof part. In the open position, the front roof part is arranged below the rear roof part and the outer surfaces of the roof parts face upwardly.

9 Claims, 6 Drawing Sheets

MOTOR VEHICLE WITH A RETRACTABLE ROOF

REFERENCE TO RELATED APPLICATIONS

This application is the U.S. national phase application of PCT/DE2004/000011, filed 08 Jan. 2004, which claims priority from German patent application No. DE20300648.8, filed Jan. 16, 2003, the entire content of both of which are incorporated herein by reference.

FIELD OF THE INVENTION

The present invention relates to a motor vehicle with a retractable roof comprising at least two roof parts which are joined to one another via articulated connectors, are made as a rigid shell, are arranged in series in a common closed position covering the passenger compartment and can be moved from said closed position into an open position while being stored in a top reception space at the rear, in which open position the front roof part, or the respective front roof part, is arranged beneath the rear roof part, or the respective rear roof part, and the outer surfaces of all roof parts face upwardly.

BACKGROUND OF THE INVENTION

A motor vehicle with a retractable roof is known from German patent document DE 196 42 154 A1. The roof disclosed therein has three roof parts, with the front and the middle roof parts being connected to the respective rear roof part via respective first and second articulated connectors. In this design, the first articulated connector is formed by a four-bar linkage having two substantially parallel control levers.

The known retractable roof, however, has the disadvantage that all three roof parts are disposed parallel to one another at a relatively large spacing, whereby a tall roof stack results.

SUMMARY OF THE INVENTION

Preferred embodiments of the present invention eliminate, or at least reduce, the aforesaid disadvantage.

The present invention provides a motor vehicle with at least one articulated connector including two control levers which form a four-bar linkage. The control levers are rotatably connected at one end to the rear roof part, or to the respective rear roof part, and are rotatably connected at another end, to a support plate. The support plate is movably connected to the front roof part, or to the respective front roof part, or to a roof part receiver fixedly connected to the front roof part, or to the respective front roof part.

The support plate may be rotatably connected to the front roof part, or to the roof part receiver.

A control rod is advantageously arranged between one of the levers of the four-bar linkage and the front roof part or the roof part receiver.

The control rod is preferably rotatably connected to one of the control levers of the four-bar linkage, at the one end, and to the front roof part, or to the respective front roof part, at the other end.

The control lever preferably has an angled extension and the control rod is rotatably connected to the extension.

In accordance with a further preferred embodiment of the present invention, provision can be made for the position of the bearing plate relative to the front roof part, or to the respective front roof part, or to the roof part receiver to be variable during the movement out of the open position into the closed position.

Provision can also be made for the support plate to vary its angular position to the front roof part, or to the respective front roof part, or to the roof part receiver during the movement out of the open position into the closed position.

An advantage of present invention is that the roof parts have a reduced spacing to one another at their respective front edges with respect to their respective rear edges in the open position (support position) by the provision of a four-bar linkage arrangement and of a support plate. The resulting roof stack thereby takes up a space which is further reduced overall, in particular with respect to the storage height.

The following are further advantages of the preferred embodiment:

No separate drive is necessary due to a compulsory guidance;.

The linkage avoids any contact of the roof parts at the lowest roof part spacing; and Low additional effort for kinematics and assembly.

BRIEF DESCRIPTION OF THE DRAWINGS

Further features and advantages of the invention result from the claims and from the following description in which an embodiment is explained in detail with reference to the schematic drawings.

DETAILED DESCRIPTION OF THE INVENTION

Figure 1:
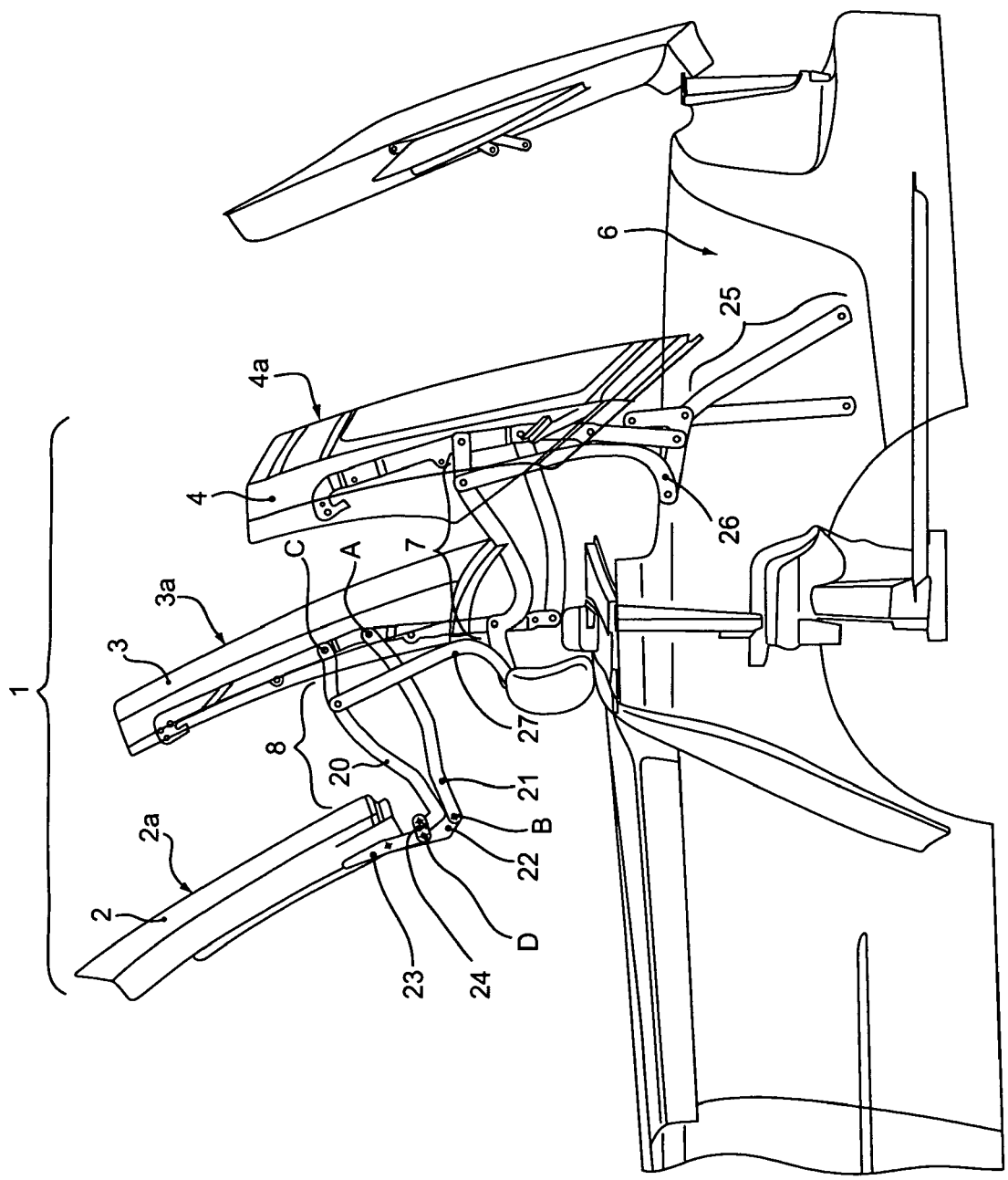
FIG. 1 is a side view of a rear region of a motor vehicle with a roof having three roof parts in accordance with a preferred embodiment of the invention in a movement phase during the movement from an open position into a closed position, or vice versa.

As shown in FIG. 1, a retractable roof 1 has three roof parts 2, 3 and 4. They are arranged in series in a common closed position (not shown) covering the passenger compartment (not characterized), are made as a rigid shell, are connected to one another via articulated connectors 7 and 8 and can be moved from the closed position into an open position (not shown) and stored in a top reception space 6 at the rear. In the open position the respective front roof part 2 or 3 is arranged beneath the respective rear roof part 3 or 4 and the outer surfaces 2a, 3a and 4a of all roof parts 2, 3 and 4 face upwardly. In FIG. 1, the retractable roof 1 is located in a movement phase during the movement out of the open position into the closed position, or vice versa. The articulated connector 8 includes two control levers 20 and 21 which form a four-bar linkage with pivots shown at A, B, C, and D. The control levers 20 and 21 are rotatably connected, at one end, to the rear roof part 3 and are rotatably connected, at another end, to a support plate 22. The support plate 22 is rotatably connected to a roof part receiver 23 fixedly connected to the front roof part 2. The roof parts 2, 3 and 4 are thus guided via the control levers 20 and 21 which, on the one hand, effect a compulsory control between the articulated connector 8 and the articulated connector 7 arranged behind it. On the other hand, the compulsory guidance of all three roof parts 2, 3 and 4 is completed via a coupling lever 26 hinged at the one end to a main support 25 and hinged at the other end to the articulated connector 7 located between the rear two roof parts 3 and 4 and via a second coupling lever 27 hinged at the one end to the articulated connector 7 located between the rear two roof parts 3 and 4 and at the other end to the articulated connector 8 located between the front two roof parts 2 and 3.

Figure 2:
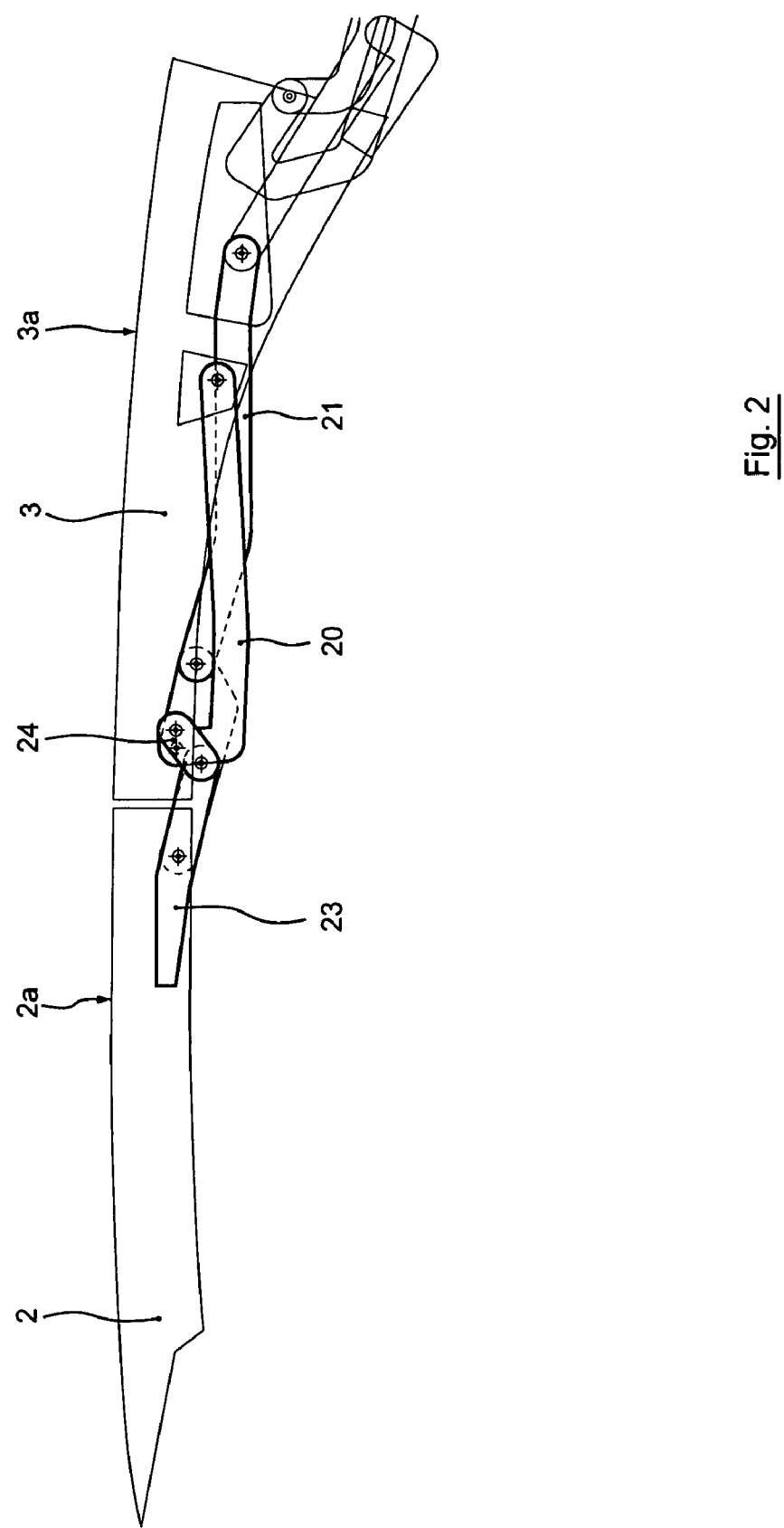
FIG. 2 illustrates a section of the roof of FIG. 1 in the closed position.
Figure 3:
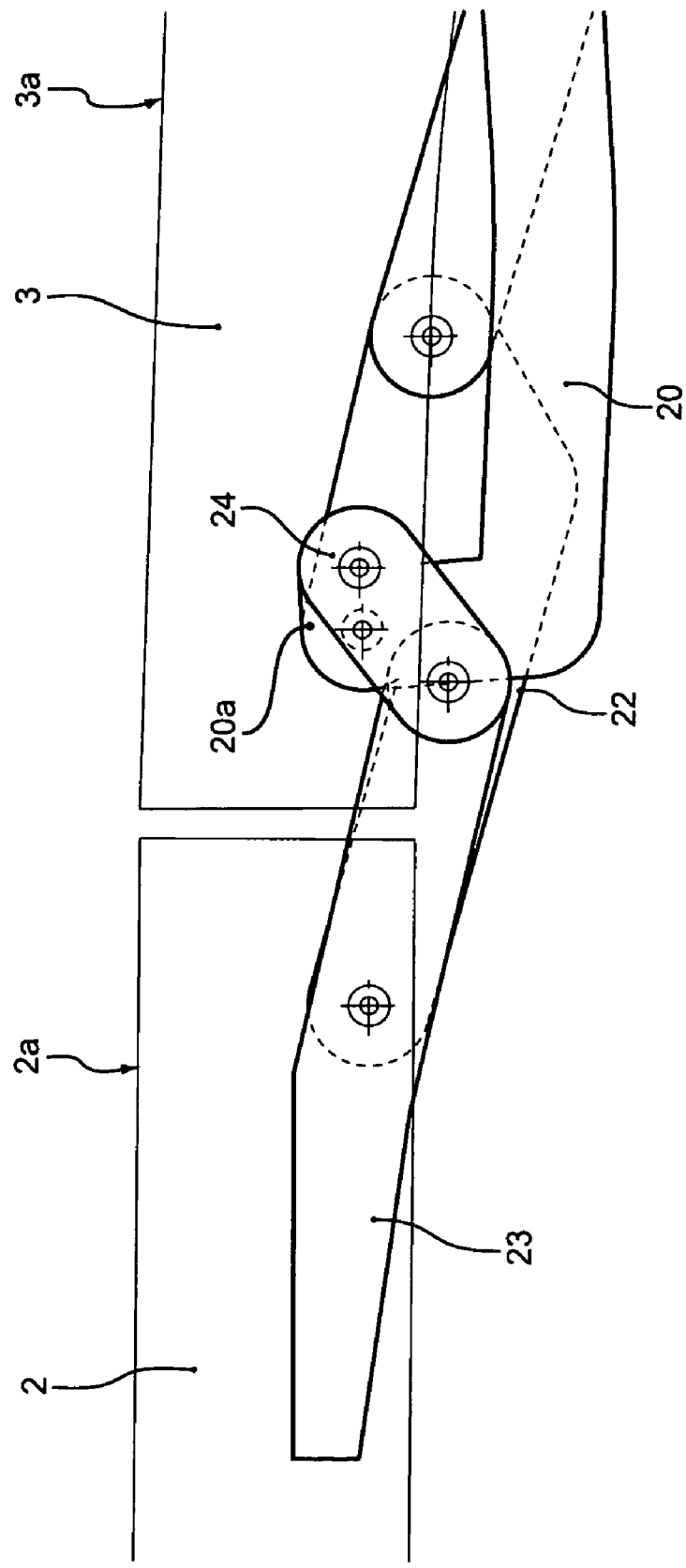
FIG. 3 is a detail view of FIG. 2.

As shown in FIGS. 2 and 3, the two control levers 20 and 21 of the articulated connector 8 are rotatably connected to the support plate 22 at their end closest to the front roof part 2. This support plate 22 is in turn pivotably connected to the roof part receiver 23. The front roof part 2 is firmly connected to this roof part receiver 23. A control rod 24 is rotatably connected at both ends and interconnects the control lever 20 and the roof part receiver 23. The control lever 20 has an angled extension 20a, to which the control rod 24 is hinged, at its end by the support plate 22.

Figure 4:
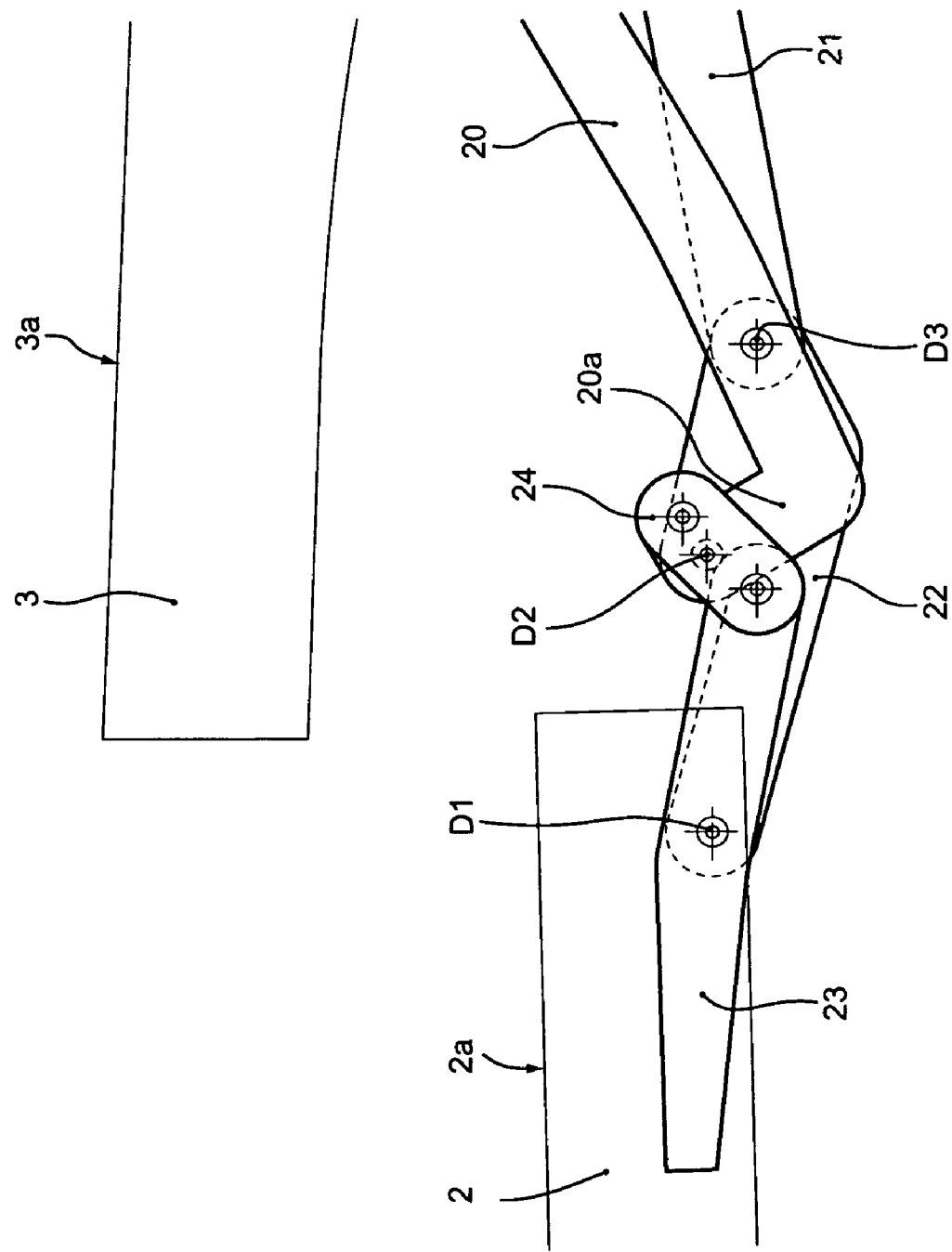
FIGS. 4 to 6 are detail views similar to FIG. 3 in different movement phases.
Figure 5:
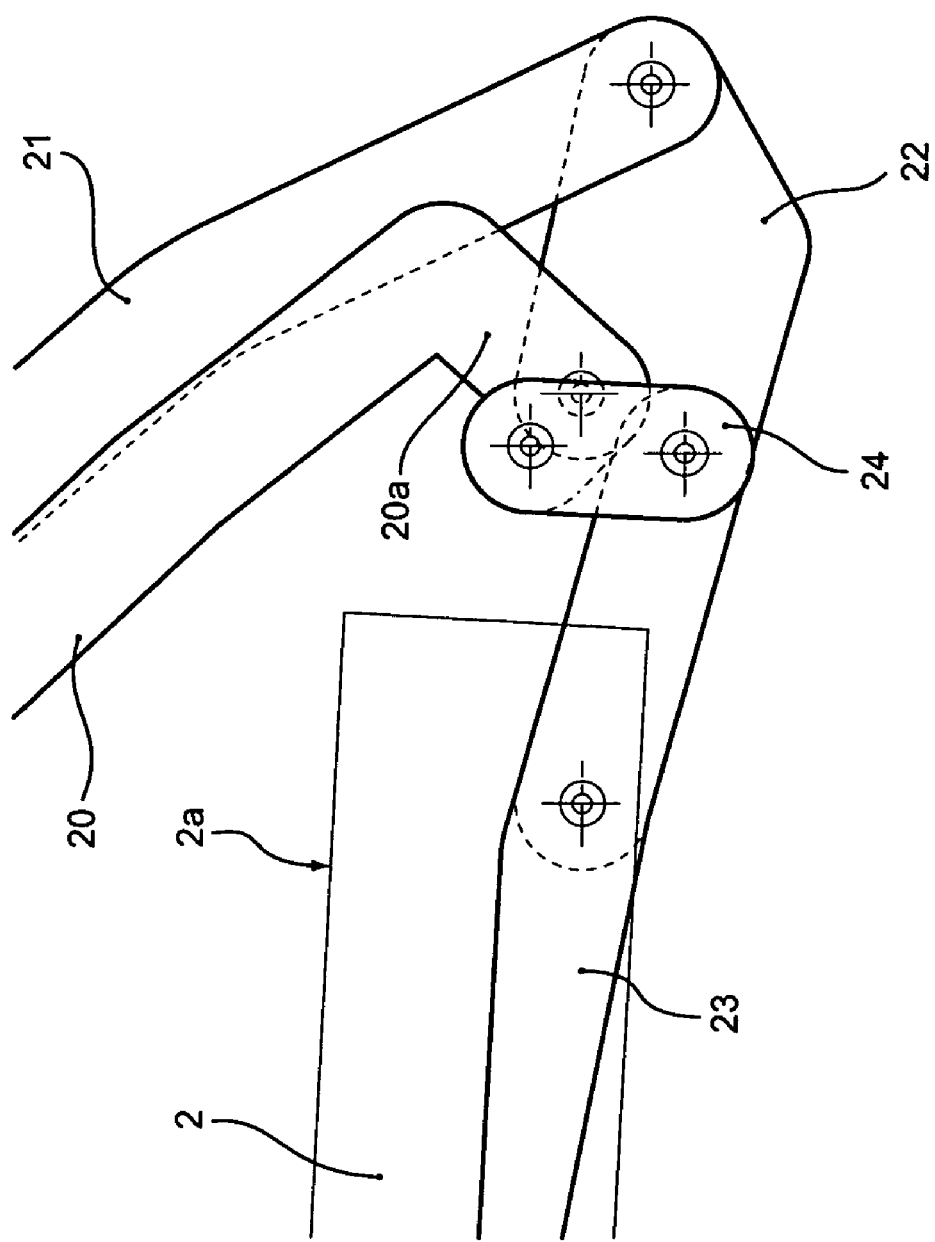
Figure 6:
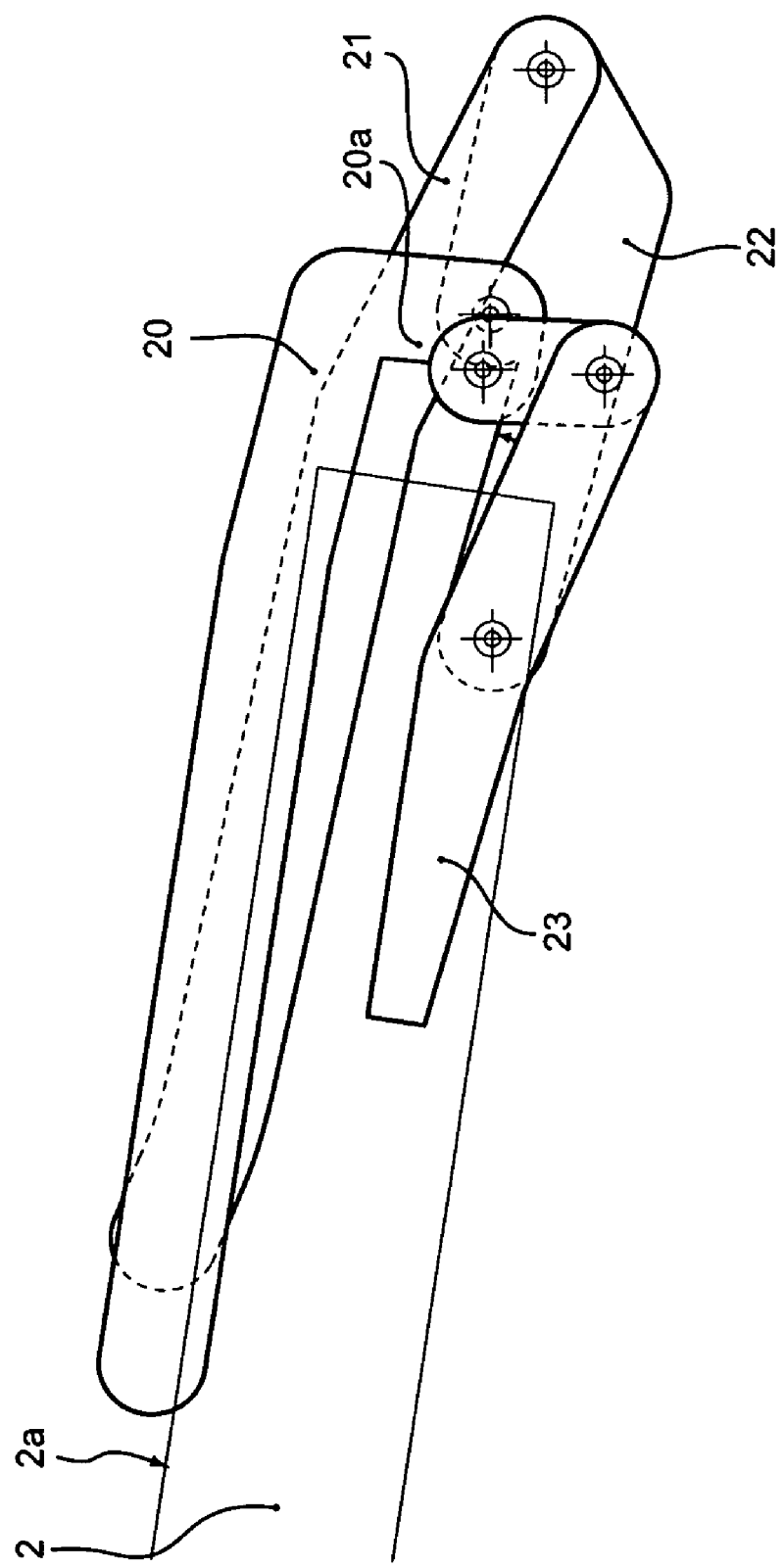

As shown with reference to FIGS. 4 to 6, the control rod 24 is pivoted via the control lever 20 as soon as the two front roof parts 2 and 3 are moved toward one another via the articulated connector 8. Since the control rod 24 is connected to the roof part receiver 23, the position of the support plate 22 relative to the roof part receiver 23 is changed by the pivot movement. This can be seen in particular with reference to a comparison of FIGS. 2 and 6. In FIG. 6, the angular change and the direction of angular change is characterized by an arrow for this purpose.

In view of the fact that the support plate 22 is displaced at least approximately parallel to the rear roof part 3 via the articulated connector 8, the front roof part 2 is moved toward the rear roof part 3 by the angular change of the support plate 22 to the roof part receiver 23. As such, the spacing of the respective front edges of the roof parts 2 and 3 is reduced with respect to the spacing of the respective rear edges in the storage position. Even small angular changes effect significant positional changes of the front edge of the front roof part 2 due to the extent of the roof part.

The stored roof stack is reduced in its height overall at least in its front region due to a storage of this type and it takes up less space in the top receiver space with respect to a roof with roof parts disposed parallel to one another stored in a conventional manner.

The features of the invention disclosed in the above description, in the drawings and in the claims can be utilized both individually and in any desired combinations for the realization of the invention in its different embodiments.

The invention claimed is:

1. A motor vehicle with a retractable roof, comprising:
at least two roof parts movable between a closed position covering the passenger compartment and an open position stored in a rear receiver space, the roof parts each being a rigid shell, the at least two roof parts including at least a first roof part and a second roof part which is positioned behind the first roof part when the roof parts are in the closed position, the roof parts each having an outer surface that faces upwardly when the roof parts are in the closed position;
an articulated connector interconnecting the first and second roof parts, the articulated connector including two control levers, which form a four-bar linkage, and a support plate, the control levers each having one end rotatably connected to the second roof part and another end rotatably connected to the support plate, the support plate being movably connected to the first roof part;
wherein in the open position the first roof part is arranged below the second roof part and the outer surfaces of the roof parts face upwardly.

2. The vehicle of claim 1, wherein the first roof part includes a roof part receiver, the support plate being movably connected to the roof part receiver.

3. The vehicle according to claim 1, wherein the at least two roof parts further comprises a third roof part which is positioned behind the second roof part when the roof parts are in the closed position.

4. The vehicle according to claim 1, wherein the support plate is rotatably connected to the first roof part.

5. The vehicle according to claim 1, further comprising a control rod is arranged between one of the control levers of the four-bar linkage and the first roof part.

6. The vehicle according to claim 5, wherein the control rod is rotatably connected to the one of the control levers and rotatably connected to the first roof part.

7. The vehicle according to claim 6, wherein one of the control levers has an angled extension and the control rod is rotatably connected to the extension.

8. The vehicle according to claim 1, wherein the position of the support plate relative to the first roof part is variable during the movement out of the open position into the closed position.

9. The vehicle according to claim 8, wherein the support plate varies its angular position with respect to the first roof part during the movement out of the open position into the closed position.

* * * * *

UNITED STATES PATENT AND TRADEMARK OFFICE
CERTIFICATE OF CORRECTION

PATENT NO. : 7,309,098 B2  Page 1 of 1
APPLICATION NO. : 10/542462
DATED : December 18, 2007
INVENTOR(S) : Frank Neubrand It is certified that error appears in the above-identified patent and that said Letters Patent is hereby corrected as shown below:

Column 2, line 8, replace "of present" with --of the present--

Column 4, line 33, replace "rod is arranged" with --rod arranged--

Signed and Sealed this

Third Day of June, 2008

JON W. DUDAS
*Director of the United States Patent and Trademark Office*